United States Patent

[11] 3,592,021

[72] Inventor Robert J. Mayerjak
Torrington, Conn.
[21] Appl. No 837,461
[22] Filed June 30, 1969
[45] Patented July 13, 1971
[73] Assignee Kaman Aerospace Corporation
Bloomfield, Conn.
Continuation-in-part of application Ser. No.
746,526, July 22, 1968, now Patent No.
3,481,158.

[54] FLEXIBLE COUPLING
12 Claims, 4 Drawing Figs.
[52] U.S. Cl. ..................................................... 64/12
[51] Int. Cl. ..................................................... F16d 3/62
[50] Field of Search........................................... 64/12, 11, 13, 15, 15 B

[56] References Cited
UNITED STATES PATENTS
2,721,457 10/1955 Moore.......................... 64/15 B
3,481,158 12/1969 Mayerjak ..................... 64/12

Primary Examiner—Mark M Newman
Assistant Examiner—Randall Heald
Attorney—McCormick, Paulding & Huber ABSTRACT: A drive shaft and a shaft to be driven have end fittings with diametrically opposed flange portions in which fastener elements are mounted to receive two of three rectangular flexing elements. These elements are planar, with two sets of opposed leg portions and one of said sets has its leg portions shorter than the other. The elements are arranged in axially offset relationship with respect to one another, that is, with alternate diagonal, or radially extending planes defined by their interconnected corners or vertices, angularly spaced with respect to the axis of rotation of the coupling to permit minimizing the axial length thereof and to nevertheless provide sufficient clearance between the adjacent fastener elements during misalignment of the shafts. A pair of torsion members are arranged adjacent each of the end fittings and their associated flexing elements, said torsion members being disposed at approximately right angles to the end fittings and being connected to the associated flexing elements by fastener elements connecting an additional flexing element intermediate the elements associated with the drive and the driven end of the coupling.

PATENTED JUL 13 1971

INVENTOR.
ROBERT J. MAYERJAK

BY
McCormick, Paulding & Huber
ATTORNEYS

FLEXIBLE COUPLING

This application is a continuation-in-part application of my copending application Ser. No. 746,526, now Pat. No. 3,481,158.

BACKGROUND OF THE INVENTION

This invention relates to flexible couplings, and deals more particularly with a coupling comprising flexible resilient elements of quadrilateral configuration of the general type disclosed in my previous application entitled "Flexible Coupling" filed July 22, 1968 under Ser. No. 746,526.

Flexible coupling constructed in accordance with the above-mentioned patent application are capable of operating at a substantially constant rotational speed in spite of misalignment between the driving and the driven member. However, the quadrilaterally shaped flexing elements must them selves absorb all of the torque transmitted by the coupling, generally comprises nonplanar elements which contribute to the overall length or the resulting coupling. These elements must be quite stiff in compression to effectively transmit the torque in a stable coupling. The compression can create an unstable condition in the event that the torque being transmitted is excessive causing the leg portions to tend to bend or buckle.

A primary object of the present invention is to provide a flexible coupling employing relatively thin planar quadrilaterally shaped flexing elements to minimize the axial length of the coupling and thereby raise its critical speed in a particular installation, and also reduce the susceptibility of these elements to frictional wear at the connection joints.

Another object of the present invention is to provide a flexible coupling employing the quadrilaterally shaped flexing elements wherein the flexing elements need not absorb all of the compressive forces with the result that relatively thin planar elements can be used to advantage in a coupling with increased misalignment capability.

Still another general object of the present invention is to provide a flexible coupling of the foregoing character wherein the coupling has a minimum number of moving parts, and which coupling is therefore not only relatively inexpensive to manufacture, but is also relatively maintenance free during extended periods of use.

Still another object of the present invention is to provide a flexible coupling of the foregoing character wherein its component parts are so arranged that frictional contact therebetween is minimized or eliminated, the compressive forces being reacted not only through internal stresses in the generally rectangular flexing elements, but also through uniquely arranged torsion members, all of which components are connected one to another in a novel manner to provide a flexible coupling capable of accommodating angular misalignment or displacement of the axes of rotation of the driving and driven member.

DETAILED DESCRIPTION

Figure 2:
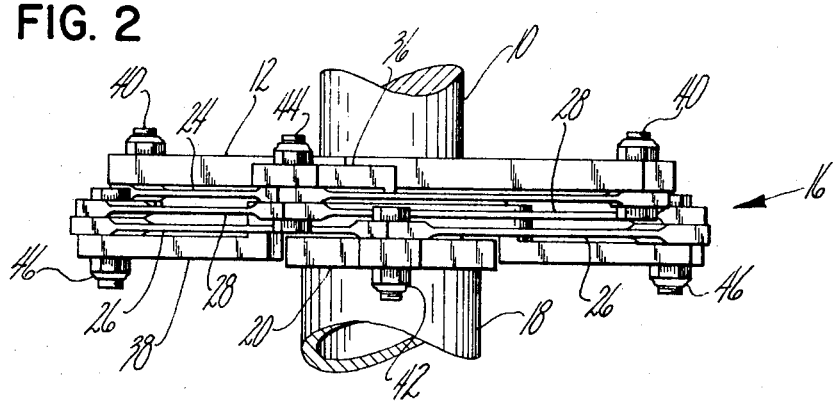
FIG. 2 is a plan view of the coupling shown in FIG. 1.
Figure 3:
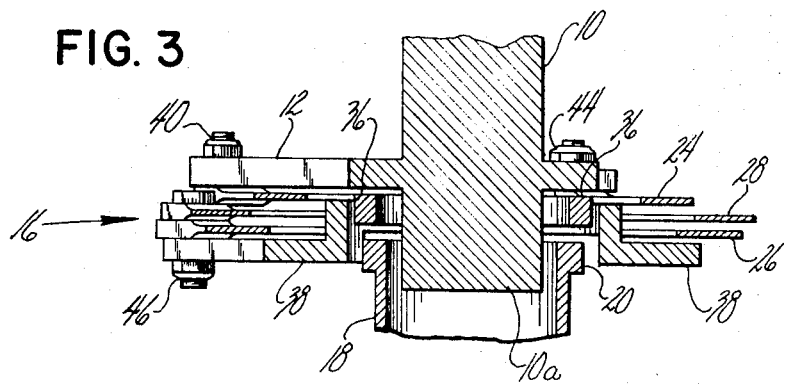
FIG. 3 is a sectional view taken on the line 3–3 of FIG. 1.

Referring now to the drawings in greater detail, a drive member 10 in the form of a driven shaft is adapted to be driven by a suitable means from (not shown) and has a flanged fitting 12 adjacent its other end. The flanged fitting 12 is secured to the drive shaft 10, as for example by welding, and has diametrically opposed ear portions which define openings for receiving suitable attachments means, or fasteners, such as the screws indicated generally at 40, 40. The fitting 12 carries a flexible coupling 16, to be described, for the purpose of rotating, with constant angular velocity a driven member or shaft 18 which may be out of alignment with the drive shaft 10. As shown in FIG. 2 and 3 the driven member 18 comprises a hollow shaft which is also provided with a flanged fitting 20 having ear portions extending radially outwardly in diametrically opposed relationship to one another, with openings for receiving screws as indicated generally at 42, 42.

Figure 1:
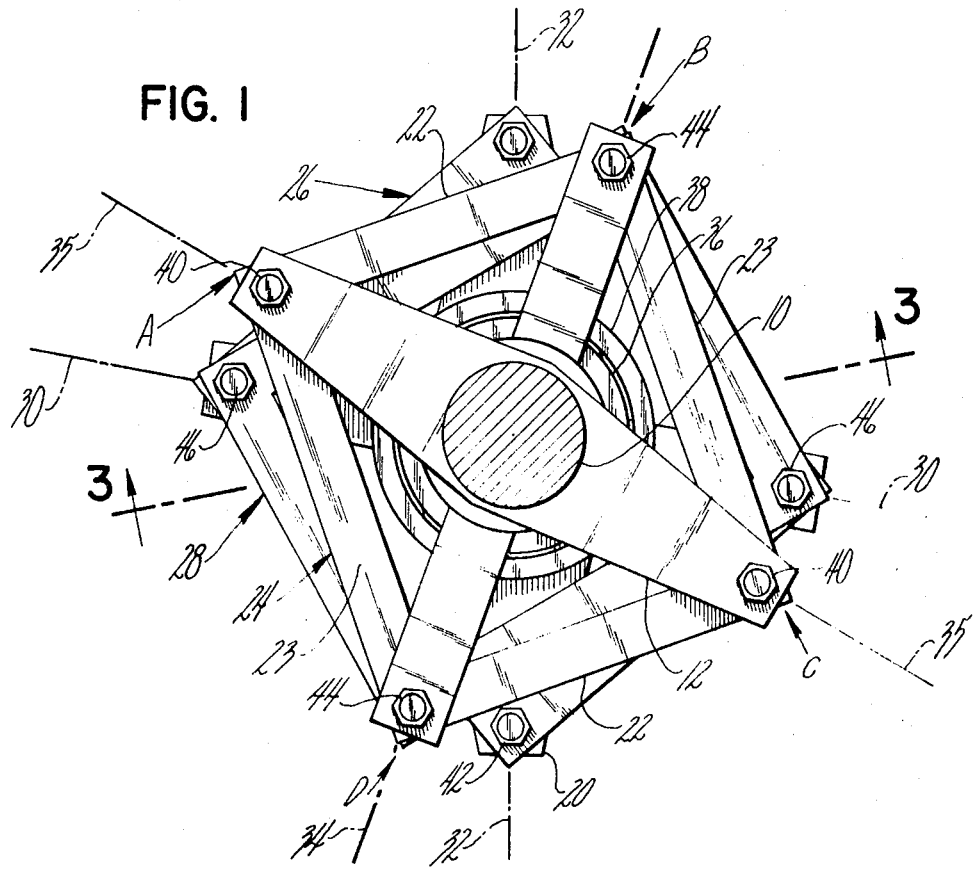
FIG. 1 is an end view of a flexible coupling constructed in accordance with the present invention, the drive shaft being shown in section.

In accordance with the present invention, at least one quadrilaterally shaped flexing element is mounted between these fittings 12 and 20 for transmitting torque between the drive shaft 10 and the driven shaft 18, especially when the axes of rotation of the shaft are not in precise alignment with one another. In the preferred embodiment shown in the drawings, three such rectangular flexing elements are provided, and each has two sets of opposed leg portions as indicated generally at 22,22 and 23,23 in FIG. 1. Each such leg portion in each set is integrally connected to the leg portions in the other set to define four vertices A, B, C, and D, as best shown in FIG. 1 with respect to the uppermost flexing element in that view. This particular flexing element is connected to the drive member 10, and more particularly to the flanged portions of the fitting 12 at two diagonally opposed vertices, or corners of the flexing element B and D by the screws 40,40. The lowermost rectangular flexing element 26 is similarly connected to the flanged portions of the fitting 18 associated with the driven member 18 by the screws 42,42 as best shown in FIG. 2.

In further accordance with the present invention a third, or additional rectangular flexing element 28 is provided between the element 24 associated with the drive shaft and the element 26 associated with the driven shaft, and these flexing elements are connected to one another along only a single diagonal line, or radially extending plane, as for example the line 30 connecting the bolts or screws 46,46 which serve to interconnect the flexing elements 26 and 28. It is noted that the other diagonally opposed vertices of these elements 26 and 28 define additional radial extending planes 32 and 34, both of which planes are angularly spaced from one another and from the diagonal 30 so that the screws 40, 42 and 46 associated therewith can be used to connect either other rectangular flexing elements thereto or to connect the coupling to a fitting such as that shown at 20. As a result of this construction, the screws can be seen to be arranged in staggered relationship around the periphery of the coupling as best shown in FIG. 1 and 2 so as to avoid interference in a coupling which thereby has its axial length minimized. This important feature of the present invention is not only achieved as a result of the rectangular configuration of the flexing elements, wherein one of the sets of leg portions in each such element are slightly shorter in length than those in the second set, but is further enhanced as a result of the fact that the flexing elements are quite thin axially, and are generally flat or planar so as to be stacked in close relationship to one another as best shown in FIG. 2. The thickened corner portions of these elements is only resorted to for providing a limited clearance between the leg portions of adjacent elements. Washers or bushings could also be used to provide this limited clearance. In the coupling configuration shown in the drawings, that is with no misalignment, the axial spacing between these adjacent leg portions can be seen to be on the order of two to three times the thickness of these leg portions. As so constructed and arranged, these leg portions are designed to actually engage one another when the transmitted torque exceeds some predetermined value at a particular misalignment angle. As mentioned hereinabove, the compressive forces in these leg portions can cause buckling at excessive values of transmitted torque. Since the maximum compressive force in one leg portion will only be reached at a point in time when the adjacent leg portion of the adjacent leg portion is not so stressed, the latter can help to support the former in case of excessive buckling, a feature which contributes to the fail-safe design of the coupling.

Figure 4:
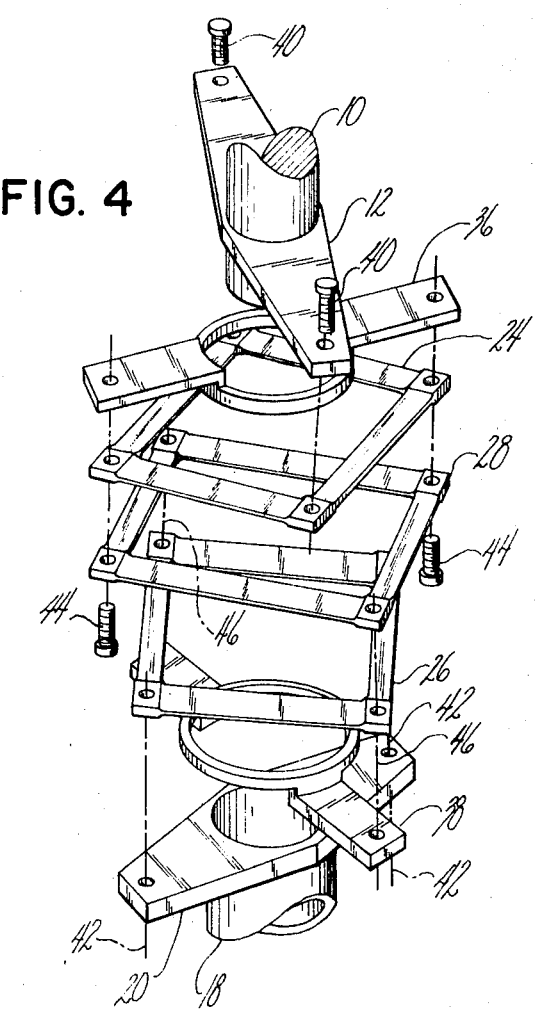
FIG. 4 is a exploded view of flexible coupling shown in FIGS. 1 through 3 inclusively.

In further accordance with the present invention, and in order to provide a flexible coupling capable of transmitting substantial torque without deformation of the generally planar relatively thin flexing elements shown in FIG. 2, a pair of torsion members are provided between the drive and the driven member and the associated flexing elements respectively, as best shown in the exploded view of FIG. 4. As there shown a first torsion member 36 is provided between the drive shaft 10 and the flexing element 24 with the end portions of said torsion member being connected to the attachment means or bolts 44,44 used to connect the two diagonally opposed vertices of said element 24 to the two diagonally opposed verticles of the center element 28. Thus, the first torsion member 36 is located between the drive shaft 10 and said element 24 although not connected to the former except through said flexing element 24.

A second torsion member 38 is located between the driven shaft 18 and its associated flexing element 26. The said second torsion member 38 has its end portions connected to the attachment means or screws 46,46 for connecting the vertices of the center flexing element 26 to the element 26 associated with said driven shaft 18.

Both the first and second torsion members 36 and 38 include ring shaped inner portions for encircling a shaft extension 10a of the drive shaft, as best shown in FIG. 3. The said rings shaped inner portions of said torsion members are nested one inside the other to further reduce the axial extent of the resulting coupling. The drive and the driven shafts 10 and 18 are of slightly different size also, the latter being hollow so as to receive the shaft extension 10a of the drive shaft 10 in order to provide a fail-safe construction in the event of structural failure of one of said flexing elements. Although not shown, it will be apparent that an elastomeric insert might be provided between the drive and the driven shafts in order to increase the fundamental natural frequency of the overall coupling.

Referring now more particularly to the exploded view of the coupling shown in FIG. 4, it will be apparent that the diagonally opposed vertices in the top flexing element 24 are connected to the drive shaft through the flanged fitting 12 by a first set of attachment screws 40,40. A second set of attachment screws 42,42 connect two diagonally opposed vertices in the lower element 28 to the driven shaft 18 through the flanged fitting 20. A third set of attachment screws 44,44 serve to connect the other two diagonally opposed vertices of the upper element 24 to the intermediate element 28. The said third set of attachment screws 44,44 also serve to connect the torsion member 36 associated with the drive shaft end of the coupling to the flexing elements 24 and 28. Finally, a fourth set of attachment screws 46,46 connect the other diagonally opposed vertices of the lower flexing element 28 to the other two diagonally opposed vertices of the intermediate element 26 as well as securing the torsion member 38 associated with the driven end of the coupling thereto.

In conclusion then the resulting coupling provides a very compact design having a minimum axial length which is achieved not only as a result of the offset relationship of the various attachment means, but also as a result of the location of the torsion members 36 and 38 in that each is provided at its associated end of the coupling outside of the stack of flexing elements themselves. The unique construction shown permits this configuration at least partly as a result of the offset ring-shaped portions of these torsion members 36 and 38, as best shown in FIG. 3. It will also be apparent that more than three such flexing elements might be adapted for use in a single coupling, but it has been found three such elements provide a convenient means of reducing the axial extent of a coupling capable of transmitting substantial torque as a result of the unique location for the torsion members 36 and 38. The said torsion members also serve to permit the use of relatively thin, flat flexing elements which can actually engage one another during the transmission of relatively high torque loads in the manner set forth hereinabove.

I claim

1. A flexible coupling for transmitting rotary motion from a drive member to a driven member, said coupling comprising a plurality of quadrilaterally shaped flexing elements, each of said flexing elements having two sets of opposed leg portions, each such leg portion in each set being integrally connected to the leg portions in the other set to define four vertices in said flexing element, first attachment means for connecting two diagonally opposed vertices in one of said elements to the drive member, second attachment means for connecting two diagonally opposed vertices in another of said elements to the driven member third attachment means for connecting the other two diagonally opposed vertices of said one element to two diagonally opposed vertices of at least one additional flexing element, means for connecting said other diagonally opposed vertices of said additional flexing element to the other diagonally opposed vertices of said element which is connected to said driven member, a first torsion member located between said drive member and said one flexing element and having end portions connected to said third attachment means, and a second torsion member located between said driven member and its associated flexing element, said second torsion member having its end portions connected to said means for connecting said vertices of said additional flexing element to said element associated with said driven member.

2. A flexible coupling as set forth in claim 1 wherein said first and second attachment means include fittings for said drive and said driven members respectively, each of said fittings having flanged portions which are spaced radially from the respective axes of rotation of said members to receive said vertices of said respective flexing elements.

3. A flexible coupling as set forth in claim 1 wherein said drive and said driven members are of different size so that an extension of one fits loosely in the other to provide a failsafe construction in the event of structural failure of one of said flexing elements.

4. A flexible coupling as set forth in claim 3 wherein said first and second attachment means include fittings for said drive and said driven members respectively, each of said fittings having flanged portions which are spaced radially from the respective axes of rotation of said members to receive said vertices of said respective flexing elements.

5. A flexible coupling as set forth in claim 4 wherein said first and second torsion members ring-shaped inner portions for encircling said extension of said drive or said driven member.

6. A flexible coupling as set forth in claim 5 wherein said ring-shaped inner portions of said first and second torsion members are axially offset toward one another out of the plane of said torsion member end portions thereof to provide clearance between said torsion members and said flanged portions of said drive and said driven fittings respectively, said flexing elements being substantially planar when said drive and said driven members are axially aligned with one another.

7. A flexible coupling as set forth in claim 6 wherein said first and second attachment means each include fastener elements extending through openings provided therefor in the vertices of said flexing elements and through openings in said fittings, and wherein said means for connecting the other diagonally opposed vertices of said fitting connected flexing elements to said additional flexing element also comprises fastener elements extending through openings provided in the vertices of said flexing elements, said last mentioned fastener elements also extending through openings provided in said torsion member end portions.

8. A flexible coupling as set forth in claim 7 wherein each of said flexing elements is generally rectangular in shape with one set of leg portions slightly shorter than those of the other set, and wherein the interconnected flexing elements are so arranged that adjacent elements have only their interconnected vertices in a common radially extending diagonal plane, the other diagonally opposed vertices of each of said adjacent flexing elements defining additional radially extending planes which are angularly spaced from one another with respect to the axis of rotation of said coupling.

9. A flexible coupling as set forth in claim 6 wherein said ring-shaped inner portions of said first and second torsion members are of different size so that one nests inside the other to minimize the overall axial length of the coupling.

10. A flexible coupling as set forth in claim 8 wherein said ring-shaped inner portions of said first and second torsion members are of different size so that one nests inside the other to minimize the overall axial length of the coupling.

11. A flexible coupling for transmitting rotary motion from a drive member to a driven member, said coupling comprising a plurality of quadrilaterally shaped flexing elements, each of said flexing elements having four vertices in said flexing element, one of said elements having two diagonally opposed vertices connected to said drive member and a second element having two diagonally opposed vertices connected to said driven member, means for connecting the other two diagonally opposed vertices of said one element to the other two diagonally opposed vertices of said second element, and at least one torsion member located between said drive member and said one flexing element and having end portions connected to said one flexing element by said element connecting means.

12. A flexible coupling for transmitting rotary motion from a drive member to a driven member, said coupling comprising a plurality of quadrilaterally shaped flexing elements, each of said flexing elements having four vertices in said flexing element, one of said elements having two diagonally opposed vertices connected to said drive member and a second element having two diagonally opposed vertices connected to said drive member, means for connecting the other two diagonally opposed vertices of said one element to the other two diagonally opposed vertices of said second element and at least one torsion member located between said drive member and said one flexing element and having end portions connected to said one flexing element by said element connecting means, and at least one torsion member located between said driven member and said second flexing and having end portions connected to said element connecting means.